US007853475B2

(12) United States Patent
Deaton et al.

(10) Patent No.: US 7,853,475 B2
(45) Date of Patent: Dec. 14, 2010

(54) INTELLIGENT ADVERTISING BASED ON MOBILE CONTENT

(75) Inventors: Juan D. Deaton, Menan, ID (US); Jesse M. Keeler, Tempe, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 432 days.

(21) Appl. No.: 11/937,699

(22) Filed: Nov. 9, 2007

(65) Prior Publication Data

US 2009/0125374 A1 May 14, 2009

(51) Int. Cl.
*G06F 17/00* (2006.01)
(52) U.S. Cl. ...................... 705/10; 705/14.42
(58) Field of Classification Search ............... 705/10, 705/14.42
See application file for complete search history.

(56) References Cited

U.S. PATENT DOCUMENTS

| 7,027,987 | B1 | 4/2006 | Franz et al. |
| 7,240,049 | B2 | 7/2007 | Kapur |
| 2003/0105670 | A1 | 6/2003 | Karakawa et al. |
| 2003/0191689 | A1 | 10/2003 | Bosarge et al. |
| 2005/0080665 | A1 | 4/2005 | Bowman-Amuah |
| 2006/0026070 | A1 | 2/2006 | Sun |
| 2006/0217110 | A1 | 9/2006 | Othmer |
| 2007/0174117 | A1 | 7/2007 | Hendrickson et al. |
| 2008/0281606 | A1* | 11/2008 | Kitts et al. ............. 705/1 |

OTHER PUBLICATIONS

Hong, Kee Wan: The International Search Report and The Written Opinion of the International Searching Authority, or the Declaration, Korean Intellectual Property Office, Republic of Korea, completed May 25, 2009, mailed May 25, 2009.
Story, Louise: Company Will Monitor Phone Calls to Tailor Ads, The New York Times nytimes.com, Advertising, Sep. 24, 2007,http://www.nytimes.com/2007/09/24/business/media/24adcol.html?ei=5065&en=5822f6a12e575488&ex=1191297600&partner=MYWAY&pagewanted=print.

* cited by examiner

*Primary Examiner*—Thomas Dixon

(57) ABSTRACT

A method (200, 300) of managing mobile context and advertising over a communications network based on the context. The method includes identifying (204) a context (146, 152) associated with a communication sent to or received by a remote unit belonging to the user group of remote units. The method also includes determining (212) whether the identified context is associated with one or more advertisements by querying correlation data (144) to identify advertisements having context that correlates to the identified context. When the identified context is associated with one or more advertisements, the method includes transmitting (214) the one or more advertisements to at least one remote unit belonging to the user group.

4 Claims, 4 Drawing Sheets

INTELLIGENT ADVERTISING BASED ON MOBILE CONTENT

BACKGROUND OF THE INVENTION

1. Field of the Invention

The present invention generally relates to mobile communications and, more particularly, to presentation of advertisements to mobile station users.

2. Background of the Invention

Globally, the advertising industry is very large and growing. To fuel its growth, the advertising industry is continually searching for new ways in which to advertise. For instance, in recent years there has been discussion of location based advertising. With location based advertising, advertisements may be presented to consumers based on the consumer's location. For instance, if it is detected that a consumer is located at a particular shopping center, advertisements for stores located within the shopping center can be presented to the consumer on his mobile station. The consumer may not be interested in visiting the particular stores represented in the advertisements, however, nor the products or services offered by such advertisements. Thus, rather than being welcomed by the consumer, the advertisements may be perceived as an annoyance.

SUMMARY OF THE INVENTION

A first aspect of the present invention relates to a method of advertising to a remote unit belonging to a user group of remote units. The method can include identifying a context associated with a communication sent to or received by a remote unit belonging to the user group of remote units. The method also determines whether the identified context is associated with one or more advertisements by querying correlation data to identify advertisements having context that correlates to the identified context. Finally, when the identified context is associated with one or more advertisements, the method includes transmitting the one or more advertisements to at least one remote unit belonging to the user group.

A second aspect of the present invention relates to a method of managing contexts in a communication system. First, the method determines how frequently a selected context is identified. Next, when identification of the selected context is increasing, the method determines whether frequency of use of the context is equal to a first threshold. Next, the method includes adding the selected context to a context index; and linking the selected context to one or more contexts already in the context index, when frequency of use of the context is equal to the first threshold, A third aspect of the present invention relates to a server for managing contexts in a communication system. The server includes a communication manager for receiving a plurality of contexts associated with communications between a plurality of remote units of a user group. The server also includes a correlation engine coupled to the communication manager for generating correlation data by correlating a first context of the plurality of contexts with a second context of the plurality of contexts when the first and second contexts are associated with one another. The server further includes a search engine for identifying an advertisement containing context data that correlates to at least one context of the plurality of contexts. The communication manager communicates the identified advertisement to a remote unit of the plurality of remote units of the user group.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
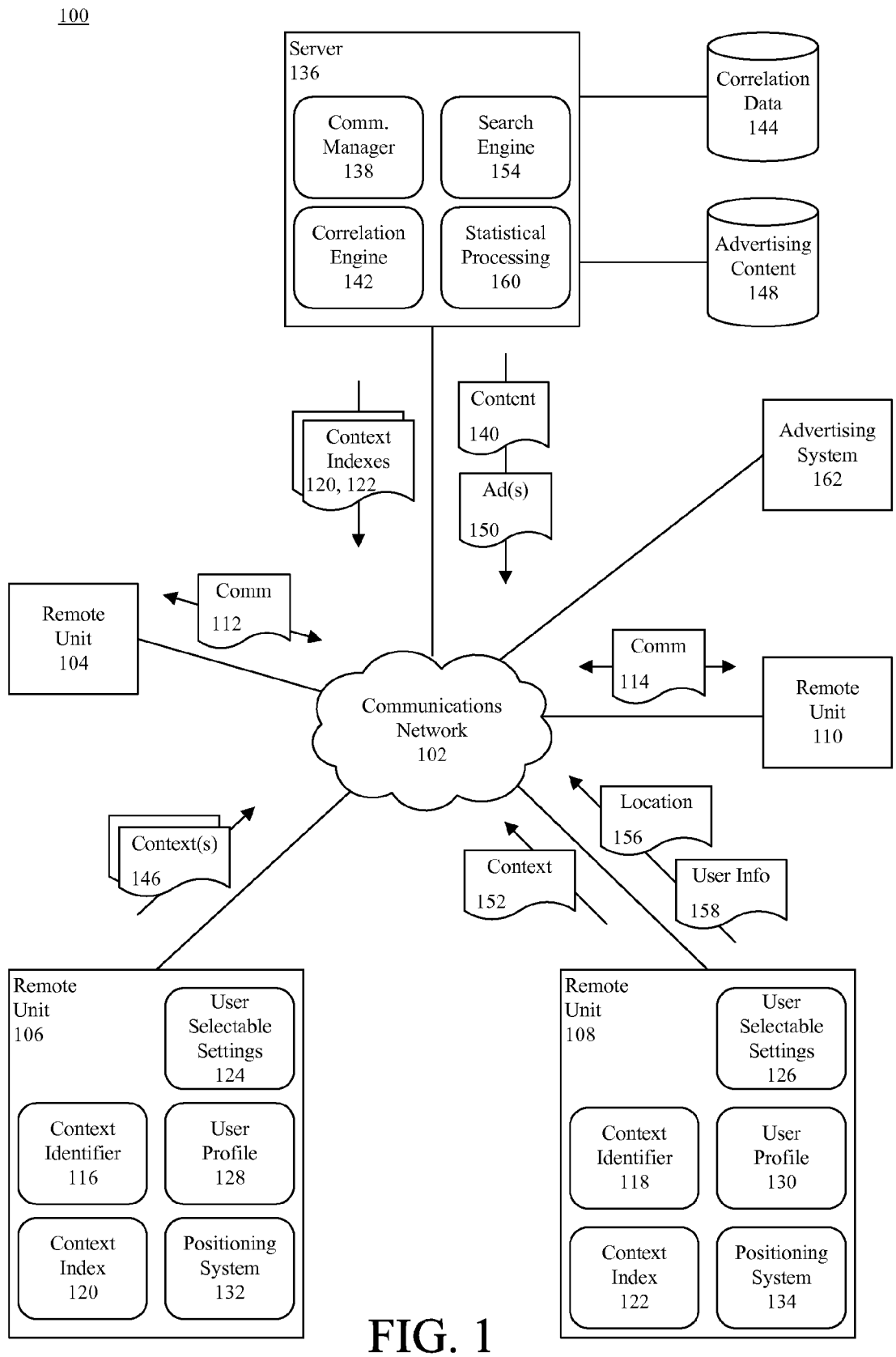
FIG. 1 depicts a communications system that is useful for understanding the present invention.

The present invention relates to a method and a system for advertising over a communications network. FIG. 1 depicts a communications system 100 that is useful for understanding the present invention. The communications system 100 can include a communications network 102, which may comprise a wide area network (WAN), such as the Internet, the World Wide Web, a dispatch communications network, an interconnect communications network (e.g. a cellular communications network), a public switched telephone network (PSTN), and the like. The communications network also may comprise a local area network (LAN), a metropolitan area network (MAN), a WiFi network, a Mesh network, a public safety network (e.g. Astro, TETRA, HPD, etc) and/or any other networks or systems over which communication signals can be propagated. In that regard, the communications network 102 can include wired and/or wireless communication links. The communications network 102 can be configured to communicate data via IEEE 802 wireless communications, for example, 802.11, 802.16 (WiMAX) and 802.20, as well as 3G, 4G, cellular technologies such as:, GSM, EDGE, HSDPA, UMTS, TDMA, CDMA, WCDMA, OFDM, 3GPP2 Long Term Evolution, FOMA, EVDO or direct wireless communication (e.g. 802.15, Bluetooth or Zigbee), or any other communications format. Indeed, the communications network 102 can be implemented in accordance with any suitable communications standards, protocols, and/or architectures, or a suitable combination of such standards, protocols, and/or architectures.

The communications system 100 also can include a plurality of remote units 104, 106, 108, 110 configured to communicate via the communications network 102. All or a subset of the remote units 104-110 form a user group of remote units. The remote units 104-110 can be, for instance, mobile stations (e.g. mobile telephones, mobile radios, mobile computers, personal digital assistants, or the like), computers, wireless gaming devices, access terminals, subscriber stations, gaming consoles, user equipment, or any other devices suitably configured to communicate via the communications network 102. As such, the remote units 104-110 can comprise one or more processors/controllers, data storage devices, user interfaces, transceivers, and/or other suitable components.

One or more of the remote units 104-110 can be configured to identify context associated with communications communicated to or from the remote units 104-110. As used herein, context can comprise one or more key terms contained in a communication, one or more attributes associated with a communication, location information, time, proximity relative to other users, length of a conversation/session, metadata, or any other information that may indicate the context of a communication. A key term may comprise one or more key words. In one arrangement, a key word only needs to be associated with the communication, but need not be fully and/or accurately articulated. For example, key words can be represented by acronyms, misspelled/misspoken words, abbreviations, etc. A communication may comprise data that includes, but is not limited to, text, audio, video and/or multimedia generated during a communication session, or content communicated to or from a remote unit. Such content can include software, a game, a video file, an audio file, a multimedia file, text, a document, an image file, wall paper, a purchase receipt, or any digital file that may be communicated to or from the remote unit 106.

During a communications session between the remote unit 104 and the remote unit 106, for example, the remote unit 106 can identify as context key terms contained in a communication 112 communicated from the remote unit 104 to the remote unit 106, or communicated from the remote unit 106 to the remote unit 104. The communication 112 can include, for instance, a text message, a spoken utterance, or text/audio communicated during a video conference. In another example, the remote unit 106 can identify as context parameters associated with content communicated to or from the remote unit 106, a content server, or another node of the communications network 102.

To facilitate identification of the context, the remote units 106, 108 each can include a respective context identifier 116, 118 and, optionally, a respective context index 120, 122. The context identifiers 116, 118 can analyze the respective communications 112, 114 to identify their respective context(s). The context identifiers 116, 118 can include suitable algorithms for identifying potential context, such as words, terms and/or attributes that satisfy established context criteria. For example, the context identifier 116 can analyze the communication 112 to identify potential context associated with the communication 112, and determine whether such context correlates to context identified in the context index 120. Similarly, the context identifier 118 can analyze the communication 114 to identify potential context associated with the communication 114, and determine whether such context correlates to context identified in the context index 122. In that regard, the context identifiers 116, 118 may include speech recognition, character recognition, image recognition and/or data parsing capabilities. Speech recognition, character recognition, image recognition and parsing of data are known to the skilled artisan.

By way of example, for terms that are repeated during a conversation or text messaging session, the context identifier 116 can access usage statistics pertaining to the word(s) contained in the terms. Terms that are repeated more frequently than would be anticipated based on the term/word usage statistics can be identified as potentially relevant context. The usage statistics can be contained on the remote unit 106, or otherwise accessed by the remote unit 106, for example via the communications network 102.

In one arrangement, the remote units 106, 108 can receive the context indexes 120, 122, or updates to the context indexes 120, 122, from a server 136. The context indexes 120,122 or updates to the context indexes 120, 122 can be periodically communicated to the remote units 106, 108, or communicated in response to an event or happenstance. For example, the context indexes 120,122 (or updates) can be communicated in response to identifying that a remote unit 106, 108 is at a particular location, in response to a user profile of a remote unit 106, 108 satisfying certain criteria, in response to identifying at a particular location or region other remote units associated with similar user profiles, or in response to any other defined event or happenstance. In that regard, the context indexes 120, 122 (or updates) can be limited to context selected based on location of the remote units 106, 108, user profiles, other users near the remote units 106, 108, and/or context selected in any other suitable manner.

Generation and maintenance of the context indexes 120, 122 will be discussed herein in greater detail. In another arrangement, rather than maintaining the context indexes 120, 122 on the remote units 106, 108, a master context list (not shown) can be maintained on the server 136. In such an arrangement, all context 146 identified by the context identifiers 116, 118 can be communicated to the server 136, and the server 136 can determine whether the identified context is contained in the content index.

Context identified by the context identifiers 116, 118 but which is not contained in the context index 120 still may be relevant for advertising purposes. Such context can be evaluated for determination whether it should be added to the context indexes 120, 122, or a context index on the server 136, as also will be discussed in greater detail.

The remote units 106, 108 further can include user selectable settings 124, 126. In one arrangement, the settings 124, 126 can include the option for a user to select whether context identification and/or presentation of advertisements on a remote unit 106, 108 are enabled or disabled. Thus, if users of the remote units 106, 108 do not wish to have a communication 112, 114 analyzed for context, such analysis can be turned off. Advertisements communicated to the remote units 106, 108 also can be disregarded. In another arrangement, for example if advertising revenue is being used to subsidize communication services for the remote units 106, 108, context identification and/or presentation of advertisements can remain enabled and an option to turn off such services need not be provided.

In addition, the remote units 106, 108 also can include user profiles 128, 130. Each of the user profiles 128, 130 can include profile information for one or more users of the respective remote units 106, 108, for instance age, gender, occupation, areas of interest, statistical information about a user (e.g. web sites visited, categories of items purchased, etc.), and/or any other information that may be gathered about a user.

Each of the remote units 106, 108 also can include a positioning system 132, 134 that identifies the respective locations of the remote units 106, 108. Each of the positioning systems 132, 134 can comprise, for example, a global positioning systems (GPS) and/or a local positioning system. There are a myriad of methods known in the art for implementing global positioning and/or local positioning, and such methods are within the scope of the present invention.

As previously mentioned, the communications system 100 also can include the server 136. The server 136 can include a communications manager 138, which can manage communications of content 140 communicated to and from the remote units 104-110. As noted, the content 140 can include software, a game, a video file, an audio file, a multimedia file, text, a document, an image file, wall paper, a purchase receipt, or any digital content that may be communicated to a remote unit 104-110. The communications manager 138 can use a suitable protocol, for example session initiation protocol (SIP), multimedia messaging service (MMS), and/or web application protocol (WAP), to provide internet protocol (IP) based services to the remote units 104-110, as well as communicate with IP based network nodes, for instance nodes accessed via the Internet. In one arrangement, the communications manager also can broker call setup for the remote units 104-110 and manage the communications 112-114. In another arrangement, brokering of call setup and management of the communications 112, 114 can be allocated to one or more other system components.

The server 136 also can include a correlation engine 142. The correlation engine 142 can identify trends in context usage and generate correlation data 144 representing such trends. For example, the correlation engine 142 can generate statistical information based on identification of the contexts 146 by the remote units 104-110 to generate statistical models. The statistical models can include, for example, frequency of context use. The correlation data 144 also can include user identifiers, user profile information, user statistics, and/or any other desired statistical information which corresponds to context trends.

When pluralities of contexts correlate to one another, such correlation also can be represented by the correlation data 144, for instance in the statistical models. During a communication session between the remote unit 104 and the remote unit 106, for example, the correlation engine 142 can correlate various contexts 146 received from the remote unit 106. If a first context 146 contains the word "movie" and a second context 146 contains the name of a particular movie, the first and second contexts can be associated with one another in the correlation data 144. Moreover, the strength of their association can be assigned a value based on how often the first and second contexts are both identified in a communication session and how far apart in time they are identified.

One or more of the contexts 146 also can be correlated with one or more contexts of advertising content 148. The context of the advertising content can include, for example, a category to which an advertisement is assigned, a location to which the advertisement is applicable, profile information for consumers to be targeted by the advertisement, or any other attributes or information that can be associated with an advertisement. The correlation of the context 146 with the advertising context can be implanted manually, for instance by a user interfacing with the server 136, or the context of the advertising content 148 can be automatically matched to the context 146 based on similarity of data (e.g. the first context contains the word "shoe" and the second context contains the word "shoe", or perhaps a name of a brand of shoe).

The advertising content 148 can include one or more advertisements, which may comprise text, audio, multimedia, image(s), video and/or data. For example, an advertisement may comprise a still image or sequence of images, a video presentation, an audible message, an audible alert, or a survey that may be presented to a user. In another example, an advertisement can comprise an image of a coupon and data that may be processed or presented by a remote unit 104-110 in order for a user to receive a discount on a product or service.

The correlation data 144 also can correlate the advertising content 148 to user profile information. For example, advertisements for science fiction movies can be associated with a science fiction category, and users whose user profiles indicate that they are interested in science fiction also can be associated with the science fiction category. In another example, advertisements can be associated with specific age groups, and users can be associated with age groups based on their user profiles. Still, a variety of other categories can be defined and both advertisements and users can be associated with such categories in any suitable manner.

Further, the correlation data 144 can correlate position information with the advertising content 148. For example, advertisements for a local store can be associated with the store's location. Such location can be defined by a coordinate, a street, a shopping center, a neighborhood, a village, a city, a zip code, a county, a state, a country, a continent, or by any other location identifier. Moreover, advertising radii can be associated with such advertising content 148. For instance, an advertisement for a local barber shop may be associated with a ten mile advertising radius, while an advertisement for a large department store may be associated with a thirty mile advertising radius.

The correlation data 144 and the advertising content 148 can be stored on one or more data storages accessible to the server 136. A suitable data storage can comprise, for example, an electronic storage medium, a magnetic storage medium, an optical storage medium, a magneto-optical storage medium, and/or any other storage medium suitable for storing digital information. The data storage(s) can be integrated with the server 136, though this need not be the case.

In operation, the correlation data 144 can be used to select advertisements that may be relevant to one or more of the remote units 104-110, such as the remote unit 108. For instance, when context 152 is received from the remote unit 108, the server 136 can select from the advertising content 148 one or more advertisements 150 correlating to the context 152 and forward the advertisements 150 to the communications manager 138, which may then communicate the advertisements 150 to the remote unit 108 for presentation to a user. Such advertisements 150 can be identified in any suitable manner. For instance, the server can include a search engine 154 that queries the correlation data 144 to identify the advertisements 150 having context that correlates to the context 152.

In one arrangement, in addition to the context 152, the search engine 154 can process other parameters to identify the advertisement 150 that are communicated to the remote unit 108. For instance, location information 156 of the remote unit 108 and/or user information 158 (e.g. based on user profile, user statistics and/or user settings) can be processed for selecting the advertisement 150. By way of example, if the context 152 identified in a text message sent by the remote unit 108 indicates the term "hair cut", the user information 158 indicates that the user is male, and the location information 156 indicates that the remote unit 108 is at a particular coordinate, one or more advertisements for barbershops and other hair cutting facilities can be automatically communicated to the remote unit 108 for presentation to the user. The advertisements 150 can be limited to those for establishments within a particular radius of the remote unit 108. Such radius can be determined by the user selectable settings 126 or advertising radii associated with the advertisements. In that regard, advertising fees paid by advertisers can be based, at least in part, on the advertising radii assigned to advertisements.

In one aspect of the inventive arrangements, the server 136 can include a statistical processing module 160 that processes statistics relating to context identification and/or context management. Such statistics can be used for selection the advertisements 150 that are communicated to the remote units 104-110. For example, if there is a plurality of advertisements that meet criteria for presentation to a particular remote unit 108 (e.g. based on context, user profile and/or location), the statistical processing module 160 can process context statistics to identify one or more advertisements 150 that are likely to be of most interest to the user of the remote unit 108.

Such statistics also can be processed to select advertisements that are communicated to an advertising system 162 for presentation to consumers. The advertising system 162 can comprise, for example, one or more digital billboards, digital signs, video systems, audio systems, audio/video systems (e.g. within department stores and clothing stores), audio systems, television sets, or any other systems on which advertising content 148 can be presented. In such an arrangement, the advertisements 150 selected to be communicated to the advertising system 162 can be selected based on trends identified by the statistical processing module 160.

The server 136 can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with one or more applications that, when being loaded and executed, control the processing system such that it carries out the methods described herein as being performed by the server 136.

Figure 2:
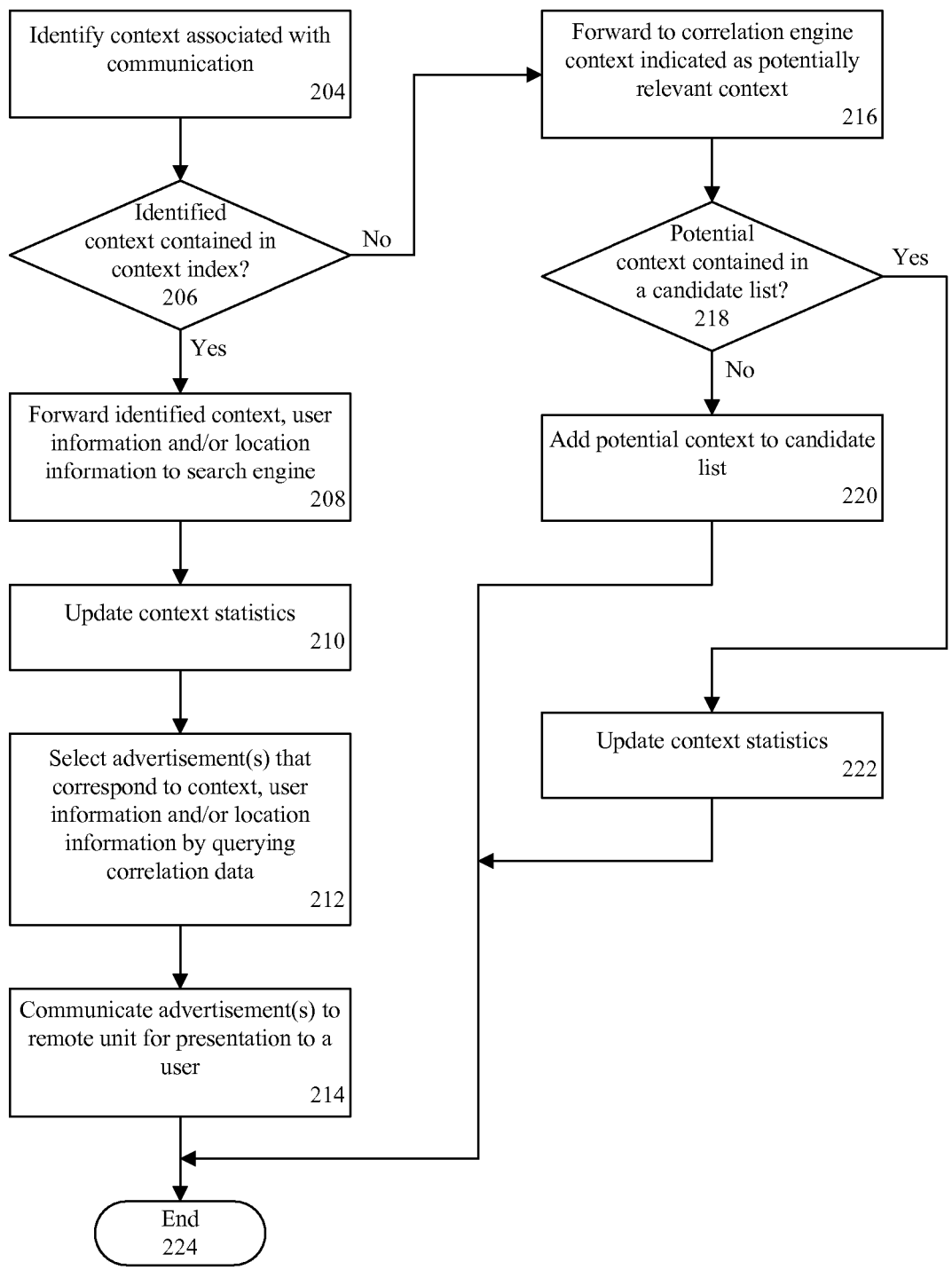
FIG. 2 is a flowchart that is useful for understanding the present invention.

FIG. 2 is a flow chart depicting a method 200 that is useful for understanding the present invention. At step 204, context (e.g. one or more words, terms, attributes) associated with the communication is identified. The communication can be, for example, a present communication between a plurality of remote units. Alternatively, the communication may have taken place at an earlier point in time. Referring to decision box 206, if the identified context is contained in a context index, at step 208 the identified context is forwarded to a search engine. Optionally, user information and/or location information also can be forwarded to the search engine. Proceeding to step 210, statistics associated with the identified context can be updated. For instance, the context search engine can forward an indicator to a correlation engine which can update a statistics table or file.

At step 212 one or more advertisements that correspond to the identified context are selected by the search engine. In one embodiment of the invention, the selection is based on querying correlation data to identify advertisements having context that correlates to the identified context It should be noted that advertisements may be selected based on a context that is associated with one or more other contexts. Optionally, the advertisements that are selected can be those that also correspond to user information and/or location information context, as previously described. At step 214, the selected advertisements are communicated to the remote unit for presentation to the user. The process can proceed back to step 204 to identify another context and continue with processing.

Referring again to decision box 206, if the identified context is not contained in the content index, the process proceeds to step 216 and the identified context is forwarded to the correlation engine and indicated as being potentially relevant. At step 218, if the context indicated as being potentially relevant is not contained in a candidate list, at step 220 the context is added to the list as a context candidate. The process then ends at 224.

If, however, at step 218 the potentially relevant context is contained in the candidate list (i.e. is already a context candidate), at step 222 the statistics for the context can be updated, for example within statistical models maintained in the correlation data previously described. Such statistics can include a total number of times the context has been identified in communications and/or a total number of times the context has been identified in communications within one or more time periods. Such time periods can be defined by seconds, minutes, hours, days, weeks, months, quarters, years, or any other desired time reference. For example, the statistics can track the number of times a context has been identified within the last day, the last week, the last month and the last quarter.

Other statistical information relevant to a context also can be maintained. For instance, the statistics can track the types of communications in which the context was identified, as well as the percentage of identifications associated with each communication type. Such types of communications can include, but are not limited to, communications between two remote units, group calls, conference calls, file downloads, and so on. In addition, profiles of users sending and/or receiving the communications can be statistically tracked. For instance, the statistics can indicate the distribution of the context identification among different age groups, genders, geographic locations, etc.

Statistical information also can be maintained on other context identified during a communication session in which the subject context was identified. In one arrangement, the statistical information can be limited to such other context that was identified within a specified time of the subject context being identified. Thus, if the subject context is a title of a particular movie, and the other context is the term "movie", and the context "movie" was identified within one minute of the subject context (e.g. before, after or simultaneously), such happenstance can be indicated in the statistics.

The statistical information gathered about the use of contexts can be communicated to advertisement personnel and/or an advertisement system, and processed to identify trends among users, as well as potential advertising opportunities. Moreover, the processes described herein can help advertisers to target their advertisements, thereby gaining the most benefit for their advertising budget. Further, a provider of communications services can provide free, or subsidized, communications services to customers who allow the context identification and advertising processes described herein to be implemented with their remote units. In such an arrangement, the ability to turn off or block the advertising content can be disabled on the remote units, as noted. To generate revenue, the communications services provider can charge advertisers for the advertising services offered by the communications network.

Figure 3:
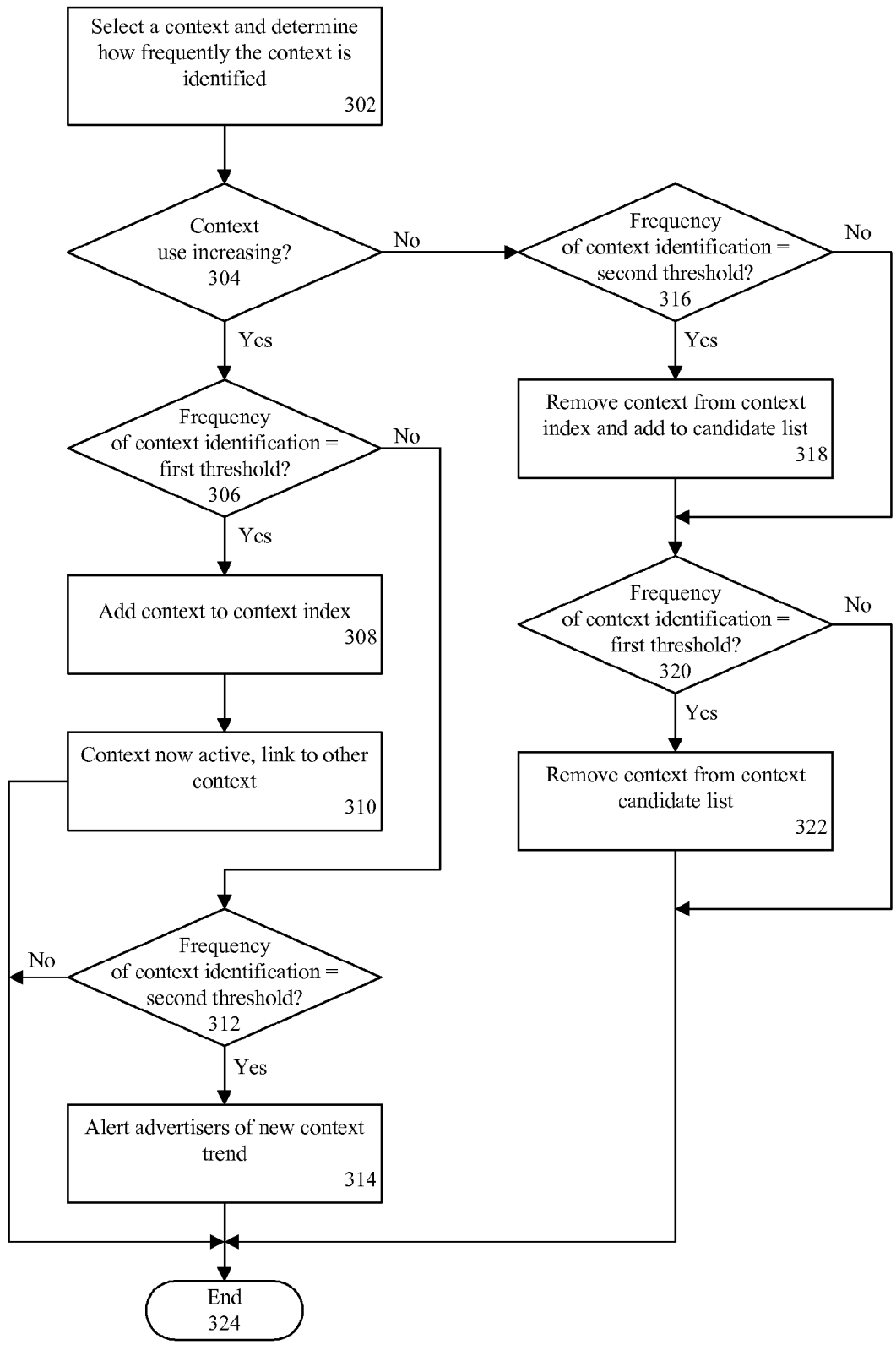
FIG. 3 is another flowchart that is useful for understanding the present invention.
Figure 4:
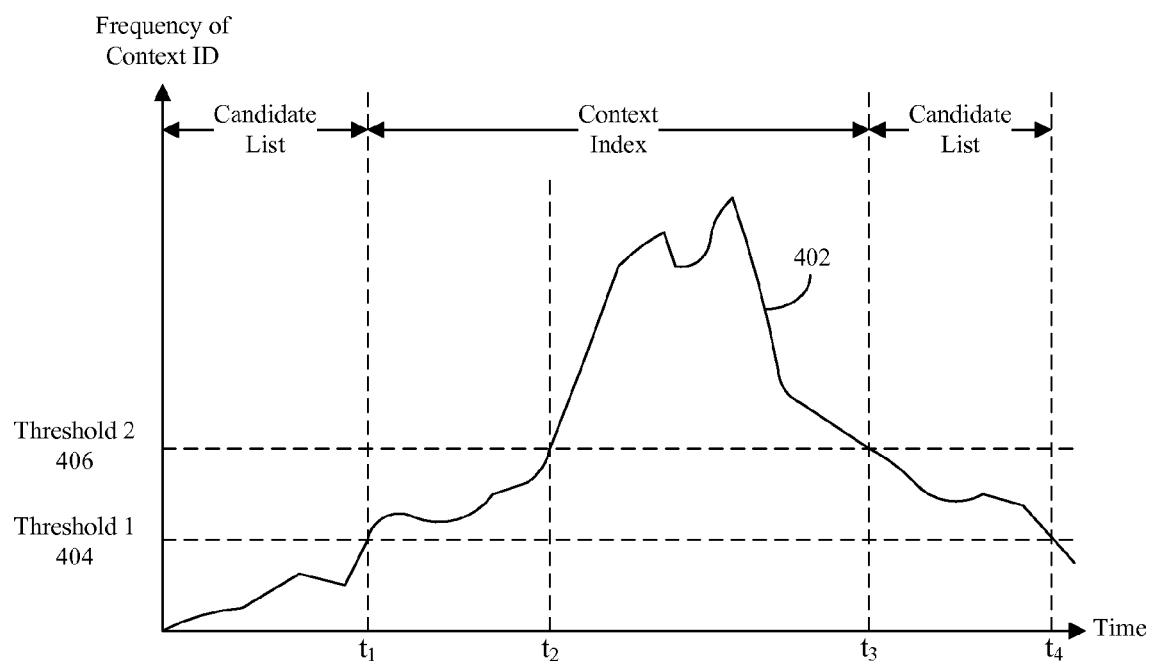
FIG. 4 depicts a graph that is useful for understanding the present invention.

FIG. 3 is a flow chart depicting an embodiment of a method 300 of managing contexts, and FIG. 4 is a graph 400 depicting a frequency of context identification vs. time, both of which are useful for understanding the present invention. The method 300 begins in a state in which pluralities of contexts are contained in the correlation data, in data lists, in data tables, or elsewhere. At step 302, a context is selected and its statistical information is processed to determine the frequency that the context is identified within communications. Such determination can be based upon the number of times the context is identified for a particular time frame. As noted, the time frame can be defined by seconds, minutes, hours, days, weeks, months, quarters, years, or any other desired time reference. Also making reference to FIG. 4, the frequency for a particular example context is represented by the trace 402.

Proceeding to decision box 304, if the frequency of the context identification is presently increasing, the process proceeds to decision box 306. If the frequency of context identification is equal to a first threshold 404, at step 308 the identified context is added to the context index. The identified context may also be removed from the context candidate list. Proceeding to step 310, the context is considered active and can be associated with other context(s), including context(s) that may be associated with advertising content. Next, the process ends at step 324. It should be noted that although there can be a one-to-one correlation between contexts, this need not be the case. Indeed, a particular context can be associated with any other number of contexts.

The association between the subject context and other contexts can be implemented in any suitable manner. For example, the association can be based on the statistics pertaining to the identification of the subject context in communication sessions in which the other contexts are also identified. If, when a first context is identified, a second context is also identified forty percent of the time, and a third context is identified twenty percent of the time, the association between the first and second contexts can be assigned a higher level of correlation than the association between the first and third contexts.

Referring again to decision box 306, if the frequency of context identification is not equal to the first threshold 404, the process determines at decision box 312 whether the frequency of context identification is equal to a second threshold. If the frequency of context identification is equal to a second threshold 406 at a time $t_2$, the process alerts potential advertisers of a new context trend at step 314. For example, potential advertisers can be notified that the subject context represents a growing trend among consumers, and therefore merits consideration for targeted advertising. Next, the process ends at step 324.

If at decision box 312 the frequency of context identification is not equal to the second threshold, the process ends at step 324. Thus, if the process determines that the frequency of context use does not equal either the first threshold or the second threshold, the context remains on its present list (e.g. candidate list or context index). Of course, while the context is maintained on the context list, the context's statistical information can be periodically processed in order to update the correlation data.

Referring again to decision box 304, if the frequency of the context identification is not increasing, for instance it is decreasing, the process proceeds to decision box 316. At decision box 316, a determination is made whether the frequency of context identification is equal to the second threshold 406, for instance at time $t_3$. If so, at step 318 the context is removed from the context index and added to the candidate list. If not, the process determines whether the frequency of context identification is equal to the first threshold at decision box 320. If the frequency is equal to the first threshold 404, for instance at time $t_4$, the process removes the context from the candidate list at step 322. At step 324, the process ends.

The method 300 can be repeated as desired to update the correlation data, thereby insuring that presently relevant contexts are maintained in the context index(es). For example, the method 300 can be repeated multiple times in an hour, multiple times in a day, multiple times in a week, multiple times in a month, or at any other desired interval.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

As noted, the present invention can be realized in hardware, software, or a combination of hardware and software. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

This invention can be embodied in other forms without departing from the spirit or essential attributes thereof Accordingly, reference should be made to the following claims, rather than to the foregoing specification, as indicating the scope of the invention.

What is claimed is:

1. A method of advertising to a remote unit belonging to a user group of remote units, the method comprising:

identifying, by the remote unit, a context associated with a communication sent to or received by the remote unit belonging to the user group of remote units;

determining, on a server, whether the identified context is associated with one or more advertisements by querying correlation data to identify advertisements having context that correlates to the identified context; and when the identified context is associated with one or more advertisements, transmitting, by the server, the one or more advertisements to at least one remote unit belonging to the user group wherein transmitting the one or more advertisements comprises transmitting the one or more advertisements to at least one remote unit belonging to the user group that did not send or receive a communication containing the identified context.

2. The method of claim 1 wherein before determining whether the identified context is associated with one or more advertisements, the method comprises:
   determining, by the server, whether the identified context is contained in a context index;
   when the identified context is not contained in the context index, determining, by the server, whether the identified context is contained in a candidate list; and
   when the identified context is not contained in the candidate list, adding, by the server, the identified context to the candidate list.

3. A method of managing contexts in a communication system, the method comprising:
   determining, by a server, how frequently a selected context is identified; and
   when identification of the selected context is increasing:
      determining, by the server, whether frequency of use of the context is equal to a first threshold; and
      when frequency of use of the context is equal to the first threshold:
         adding, by the server, the selected context to a context index; and
         linking, by the server, the selected context to one or more contexts already in the context index.

4. The method of claim 3 further comprising:
   determining, by the server, whether frequency of use of the context is equal to a second threshold; and
   when frequency of use of the context is equal to the second threshold, alerting, by the server, an advertiser of a new context trend.

\* \* \* \* \*